Feb. 3, 1970  S. G. McCARTHY ET AL  3,493,736
ELECTRO-OPTICAL CORRELATOR APPARATUS
Filed May 16, 1967  4 Sheets-Sheet 3

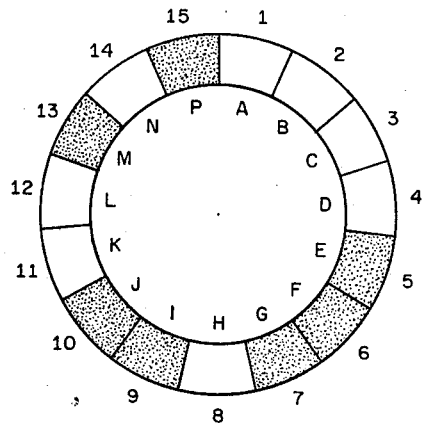
FIG.2a.
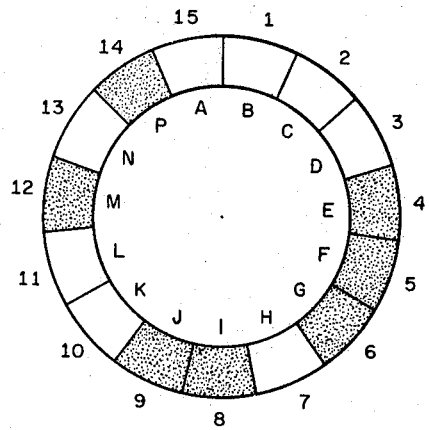
FIG.2b.
|  | CODE BIT IN FRONT OF POSITION 1 | | | | | | | | UNITS OF LIGHT IMPINGING ON CORRELATION PLANE |
|---|---|---|---|---|---|---|---|---|---|
|  | A | B | C | D | H | K | L | N |  |
| 1 | U | U | U | U | U | U | U | U | 8 |
| 2 | U | U | U |   |   | U |   |   | 4 |
| 3 | U | U |   |   |   |   | U | U | 4 |
| 4 | U |   |   |   | U | U |   | U | 4 |
| 5 |   |   |   | U | U |   | U | U | 4 |
| 6 |   |   | U |   |   | U | U | U | 4 |
| 7 |   | U |   |   | U | U | U |   | 4 |
| 8 | U |   |   | U |   | U | U |   | 4 |
| 9 |   |   | U | U | U | U |   |   | 4 |
| 10 |   | U | U |   | U |   |   | U | 4 |
| 11 | U | U |   | U | U |   |   |   | 4 |
| 12 | U |   | U |   | U |   | U |   | 4 |
| 13 |   | U |   | U |   | U |   | U | 4 |
| 14 | U |   | U | U |   |   |   | U | 4 |
| 15 |   | U | U | U |   |   | U |   | 4 |
FIG.3.

| | CODE BIT IN FRONT OF POSITION 1 | | | | | | | | UNITS OF LIGHT IMPINGING ON CORRELATION PLANE |
|---|---|---|---|---|---|---|---|---|---|
| POSITION IN CORRELATION PLANE | | A' | B' | C' | D' | H' | K' | L' | N' | |
| 1 | | | | | | | | | | 0 |
| 2 | | | | | Y | Y | | Y | Y | 4 |
| 3 | | | | Y | Y | Y | Y | | | 4 |
| 4 | | | Y | Y | Y | | | Y | | 4 |
| 5 | | Y | Y | Y | | | Y | | | 4 |
| 6 | | Y | Y | | Y | Y | | | | 4 |
| 7 | | Y | | Y | Y | | | | Y | 4 |
| 8 | | | Y | Y | | Y | | | Y | 4 |
| 9 | | Y | Y | | | | | Y | Y | 4 |
| 10 | | Y | | | Y | | Y | Y | | 4 |
| 11 | | | | Y | | | Y | Y | Y | 4 |
| 12 | | | Y | | Y | | Y | | Y | 4 |
| 13 | | Y | | Y | | Y | | Y | | 4 |
| 14 | | | Y | | | Y | Y | Y | | 4 |
| 15 | | Y | | | | Y | Y | | Y | 4 |

INVENTORS
STEPHEN G. McCARTHY
IRVING ROTH
EDWARD W. STARK
BY
ATTORNEY

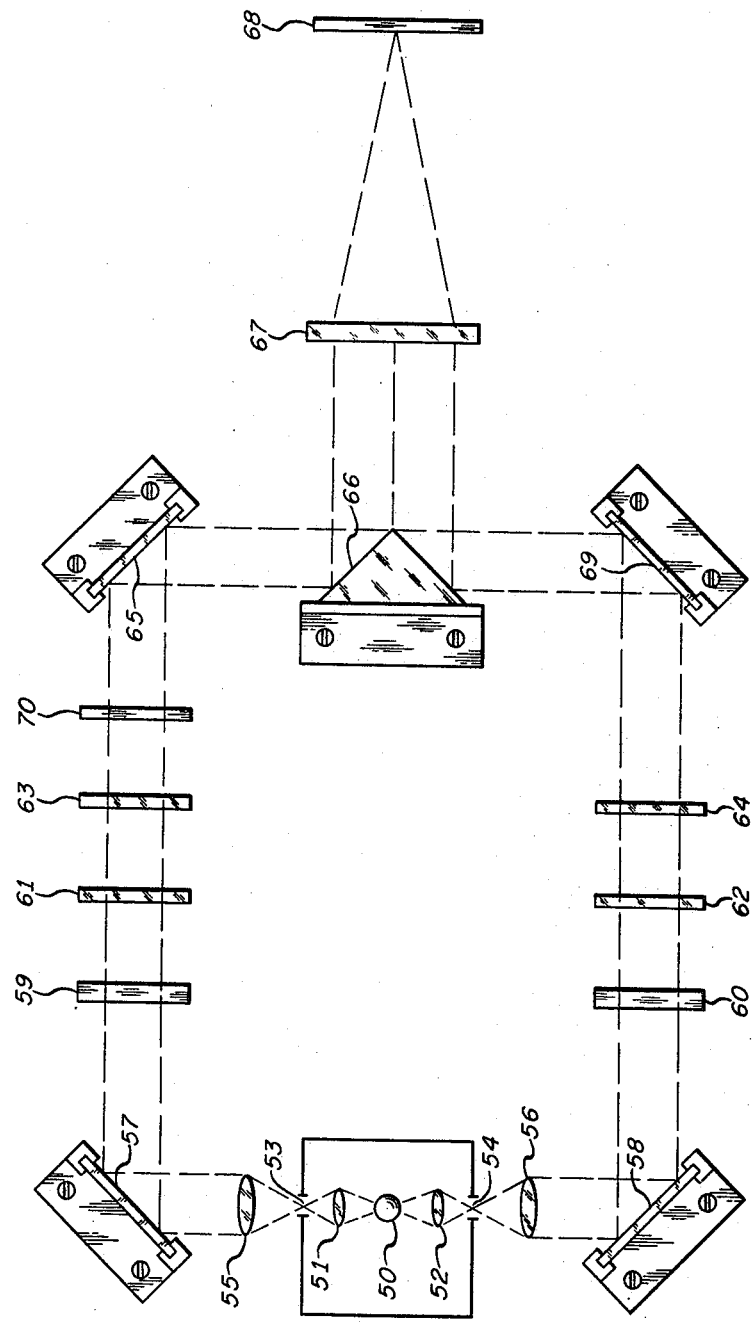

3,493,736
ELECTRO-OPTICAL CORRELATOR APPARATUS
Stephen G. McCarthy, Dobbs Ferry, Irving Roth, Williston Park, and Edward W. Stark, Garden City, N.Y., assignors to Sperry Rand Corporation, a corporation of Delaware
Filed May 16, 1967, Ser. No. 638,822
Int. Cl. G06g 9/00; H06g 7/19
U.S. Cl. 235—181                                              6 Claims

ABSTRACT OF THE DISCLOSURE

An optical correlator apparatus incorporating two optical multipliers each comprising a common source of radiant energy and one or more transparencies disposed such that the multiplier products are in spatial coincidence on a bistable recording medium located in the correlation plane, the polarity of a multiplier element in one of the optical multipliers being inverted with respect to a corresponding element in the other optical multiplier, and the multiplier products being represented by respective light beams which oppositely affect the opacity of the bistable medium, whereby D.C. background is eliminated from the correlation plane.

BACKGROUND OF THE INVENTION

The present invention relates to electro-optical data processors and more particularly to means for suppressing D.C. background in the correlation plane of an optical correlator.

Multiplication is performed in an optical correlator by propagating a light beam through either a single transparency or two transparencies serially disposed in the path of the light beam. When two transparencies are used, the signals to be correlated are recorded thereon and the light beam intensity is held constant. In the case of a single transparency device, one signal is recorded on the transparency and the other is used either to modulate the light beam intensity as a function of time or to produce a diffuse spatially modulated pattern. The multiplication product represented by the light beam emerging from the optical multiplier is subsequently integrated by a light storage medium such as a photodetector or photographic film to complete the correlation process.

Optical correlators are classified as coherent or non-coherent depending upon whether the light beam is obtained from a point or diffuse source. In a non-coherent optical correlator the electromagnetic field at a given point and time cannot be determined from a knowledge of the phase at some other point or time whereas in a coherent processor knowledge of the phase at one point at a given time permits the phase to be determined at another point at the same time but not at a different time. The term coherent in this sense, therefore, refers to a spatial characteristic of the light beam rather than the temporal characteristic normally considered in electronic and laser optic systems. A well known prior art non-coherent optical correlator comprises a diffuse source propagating an intensity modulated light beam through a coded transparency moving in a plane oriented normal to the central axis of the light beam. The modulating signal applied to the light source is identical to the code on the transparency and its temporal phase corresponds to a particular spatial location in the plane of the transparency. Consequently, a transparent code bit appears at one point in the plane of the transparency each time the light source is flashed on. This is the correlation point. At all other points in the plane of the transparency the code bits are transparent for approximately half of the light flashes, thus causing the correlation point to be presented against a D.C. background which appears grey on an integrating medium such as a photographic film. The same conditions also prevail in prior art coherent optical correlators.

SUMMARY OF THE INVENTION

The present invention overcomes the aforementioned limitations of the prior art optical correlators by the provision of a correlator apparatus comprising first and second optical multipliers disposed such that the output signals therefrom are spatially coincident upon a bistable integrating medium. In a non-coherent correlator embodiment of the invention, each optical multiplier incorporates a common radiant energy source and a pseudo-random coded reticle. Each of the reticles is rotatable in a plane oriented normal to the central axis of a light beam propagating through it and the codes on the respective reticles have inverted polarities relative to one another. In addition, the radiant energy source supplies intensity modulated light beams of different discrete wavelengths to each of the optical multipliers, one of the light beams being effective to make the integrating medium relatively more opaque while the other light beam causes the integrating medium to become less opaque. As a result, when the light modulation signal corresponds to the reticle codes, equal amounts of the two light beams of different wavelengths impinge on every part of the integrating medium except the correlation point which receives only one of the light beams. This causes the relative opacity at the correlation point to vary in proportion to the amount of light energy impinging thereon while the opacity of all other regions of the integrating medium remains unchanged. Thus, if the bistable integrating medium is initially driven to the opaque state, the correlation point appears as a relatively transparent spot against a dark background rather than the grey background produced in prior art devices. The same result is achieved in a coherent correlator embodiment wherein each optical multiplier includes two transparencies disposed in the path of constant intensity light beams of different discrete wavelengths, the polarity of the pattern on one of the transparencies being inverted with respect to that on the other transparencies.

BRIEF DESCRIPTION OF THE DRAWINGS

For a more thorough understanding of the invention, reference should be made to the following detailed specification and the accompanying drawings wherein

FIGS. 2a and 2b depict a pseudo-random coded reticle in discrete spatial orientations occurring during the operation of the embodiment of FIG. 1;

FIG. 3 is a table indicating the various positions upon which ultraviolet light impinges on the correlation plane of the embodiment of FIG. 1 during one complete revolution of the reticle shown in FIG. 2a;

FIG. 6 is a block diagram of a coherent optical correlator embodiment of the invention.

DESCRIPTION OF THE PREFERRED EMBODIMENTS

Figure 1:
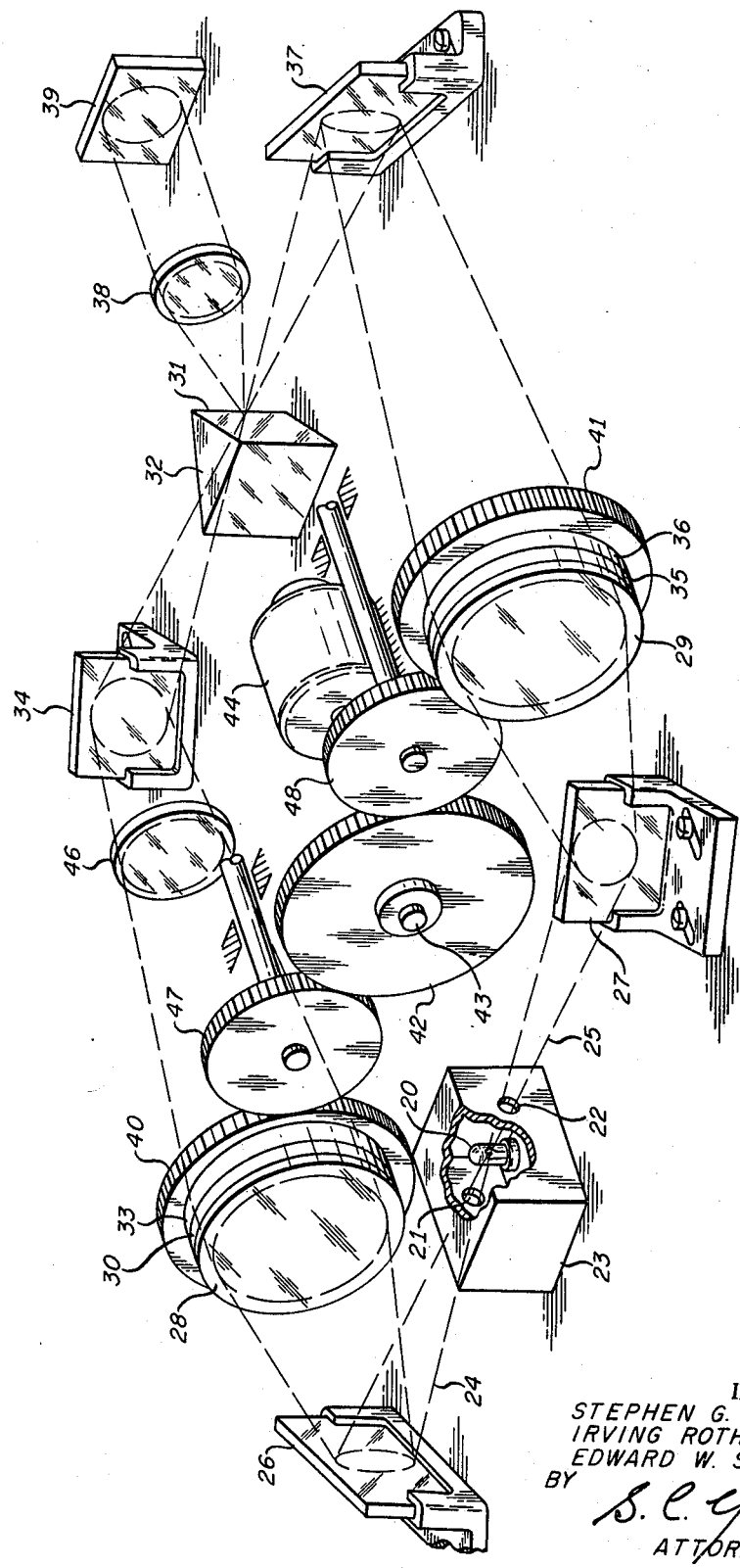
FIG. 1 is a perspective view of a non-coherent optical correlator embodiment of the invention.

Referring to FIG. 1, broad spectral band light emitted from mercury vapor lamp 20 and transmitted through apertures 21 and 22 in housing 23 forms diverging light beams 24 and 25 which reflect from mirrors 26 and 27 onto filters 28 and 29, respectively. The ultraviolet component of light beam 24 passes through filter 28 onto lens 30 which causes the beam to converge near the apex 31 of wedge mirror 32 after propagating through reticle 33 and reflecting from mirror 34, the beam being modified, of course, in accordance with the transparency of the reticle as will be explained subsequently with reference to FIGS. 2a through 5. In a similar manner, the yellow component of light beam 25 passes through filter 29 onto lens 35 and ultimately converges near the apex 31 of wedge mirror 32 after propagating through reticle 36 and reflecting from mirror 37. The ultraviolet and yellow light beams then reflect from the wedge mirror and propagate through lens 38 onto the photochromic plate 39 whereupon spatially coincident images of reticles 33 and 36 are formed. Other techniques may be used to provide spatial coincidence of the reticle images but the method described is preferred because it minimizes light losses and therefore imparts maximum light energy to the photochromic material. In this arrangement, however, the light beams reflected from the wedge mirror are not exactly parallel so that various components must be precisely aligned to make the beams converge on wedge mirror 32 as close to the apex as possible to assure that the reticle images will be spatially coincident.

Lamp 20 and reticle 33 comprise the multiplier elements of a first optical multiplier. Likewise, lamp 20 and reticle 36 are the multiplier elements of a second optical multiplier. To perform the optical multiplication in a manner compatible with the integration technique used in the present invention the reticles must be rotated in a plane oriented normal to the central axis of the light beams and the light beam intensity must be modulated. The relationship between reticle rotation and light beam modulation and the performance of a multiplication function as a consequence of said rotation and modulation will be more fully understood after a reading of the material hereinafter pertaining to FIGS. 2a through 5. Reticle rotation is provided by means of the annular gears 40 and 41 meshing with gears 47 and 48 which are driven by spur gear 42 connected to the shaft 43 of D.C. motor 44 so that both reticles are driven in the same direction at equal angular velocities. The light intensity is modulated preferably by varying the electrical signal excitation applied to the lamp although it may also be accomplished by placing a shutter mechanism in the path of a constant intensity beam emitted from the lamp. For correlation to occur, the fluctuations in the light intensity must correspond to the signal inscribed in an annular band on one of the reticles. In addition, a precise relationship must be maintained between the period of the modulation signal and the rotation rate of the reticle. More specifically, the period of the modulation signal must equal the time required for one revolution of the reticle when the code length is equivalent to the length of an annular band. To satisfy this requirement, the modulation signal may be generated at the output of a photo-detector by propagating a light beam, having a width equal to or less than one code bit, onto a photo-detector through an additional reticle synchronously driven and identically coded with reticle 33.

The integration aspect of the correlation process is performed by the photochromic plate. The opacity of ordinary photographic film can change in only one direction but photochromic film is characterized by its variable sensitivity to radiation of different wavelengths such that it becomes relatively more transparent when exposed to yellow light and more opaque when exposed to ultraviolet light, the degree of change in its opacity being determined by the amount of light energy impinging on it. As a result, photochromic material is capable of operating as a bistable recording medium.

The operation of the optical multiplier and the manner in which the D.C. background is suppressed in the correlation plane of the non-coherent correlator apparatus will now be described with reference to FIGS. 1, 2a and 2b. For simplicity of description the illustrated reticles contain a single code inscribed in an annular band having a length exactly equal to one code period. In actual practice, however, a plurality of codes may be used in different annular bands and the code period may be longer or shorter than the length of the annular band in which it is inscribed. The numerals 1-15 around the perimeter of reticle 33 represent fixed spatial positions on the photochromic plate 39 positioned in the correlation plane and the letters A to P designate individual code bits on the reticle. An electrical signal corresponding to the code inscribed on reticle 33 is applied to the mercury vapor lamp to modulate the light intensity. The location of the correlation point in the correlation plane is determined by the phase relationship between the time variations of the modulation signal and the spatial location of a particular code bit on the reticle. In a practical application, this phase relationship is arbitrary but for the purpose of explanation it will be assumed that the lamp modulation corresponds to the sequence of code bits passing in front of position 1 when the reticle rotates in a counterclockwise direction. The shaded and unshaded segments on reticle 33 represent code bits that are opaque and transparent, respectively, to ultraviolet light. When the reticle is rotated to the position illustrated in FIG. 2a, the lamp switches on and uniformly illuminates the surface of the reticle. At this instant, ultraviolet light passes through code bits A, B, C, D, H, K, L and N onto positions 1, 2, 3, 4, 8, 11, 12 and 14, respectively, on the photochromic plate. The table in FIG. 3 indicates the various positions on the photochromic plate which receive ultraviolet light as each code bit moves into alignment with position 1. For instance, when the reticle rotates in a counterclockwise direction through an angular displacement equal to the width of one code bit, code bit B becomes aligned with position 1 as shown in FIG. 2b. At this instant, the lamp once again uniformly illuminates the surface of the reticle whereupon ultraviolet light passes through code bits A, B, C, D, H, K, L and N onto positions 1, 2, 3, 7, 10, 11, 13 and 15, respectively, on the photochromic plate. When a shaded section, such as code bit E, rotates into alignment with position 1, the lamp is switched off and no ultraviolet radiation impinges on the photochromic plate. For each complete revolution of the reticle, it is seen that position 1 receives eight units of light intensity while all other positions receive four units of light intensity. Thus, if the photochromic plate was initially exposed to yellow light to make it clear, the correlation point (position 1) will appear as a dark spot against a background which is about half as dark. The semi-dark nature of the background reduces both the contrast and dynamic range of the correlator. This undesirable result is compensated by reticle 36.

Figures 4, 5:
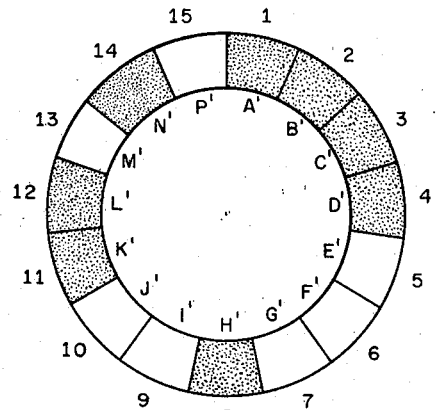
FIG. 4 depicts a pseudo-random coded reticle having inverted polarity with respect to the reticles shown in FIGS. 2a and 2b.
FIG. 5 is a table indicating the various positions upon which yellow light impinges on the correlation plane of the embodiment of FIG. 1 during one complete revolution of the reticle shown in FIG. 4.

Referring to FIG. 4, reticle 36 contains a code which is the photographic negative of the code on reticle 33, that is, at the code bit positions where reticle 33 is respectively transparent and opaque to ultraviolet light, reticle 36 is respectively opaque and transparent to yellow light. This is equivalent to a reversal of the polarity of the code on one reticle with respect to the polarity of the code on the other reticle. Since the codes are spatially aligned on the synchronously driven reticles, code bit A' on reticle 36 is aligned with position 1 on the photochromic plate concurrently with code bit A on reticle 33.

At that moment the lamp is flashed on so yellow light passes through code bits E', F', G', I', J', M' and P' onto positions 5, 6, 7, 9, 10, 13 and 15 on the photochromic plates. Referring to FIG. 5, it is seen that as each code bit rotates onto alignment with position 1, the correlation point never receives any yellow light whereas all the other positions receive four units of yellow light intensity. Since the yellow light drives the photochromic plate toward its clear state, positions 2–15 which receive both ultraviolet and yellow light remain clear while position 1 which receives only ultraviolet light, appears dark against the clear background, thus enhancing the contrast and dynamic range. It is known, however, that an ultraviolet light pulse of a given intensity and duration has a greater effect upon the relative opacity of the photochromic plate than a yellow light pulse of the same intensity and duration. For this reason a neutral density filter 46 will generally have to be disposed in the path of the ultraviolet light beam to assure that positions 2–15 remain clear.

In the coherent correlation apparatus depicted in FIG. 6, broadband spectral light emitted from mercury vapor lamp 50 is collected by lenses 51 and 52 and focussed on pin hole apertures 53 and 54 to form point light sources located at the focal point of lenses 55 and 56, respectively. Light beams eminating from apertures 53 and 54 are thus collimated by lenses 55 and 56 and reflected from mirrors 57 and 58 onto optical filters 59 and 60. Disregarding for the moment the element designated by numeral 70, filters 59 and 60 transmit ultraviolet and yellow light, respecively, through object transparencies 61 and 62 and reference transparencies 63 and 64 whereby the light output from the reference transparencies represents the product of the information recorded on the respective pairs of object and reference transparencies. When the object and reference transparencies 61 and 63 are identically coded and spatially aligned in the path of the ultraviolet light beam transmitted through filter 59, a maximum amount of ultraviolet light is reflected from mirror 65 onto wedge mirror 66 and through imaging lens 67 to photochromic strip 68. If the codes on the object and reference transparencies are not identical or if the transparencies are not spatially aligned, less ultraviolet light reaches the photochromic material. In any event, the light is always concentrated on the photochromic strip at the focus of the imaging lens. In the optical multiplier comprising transparencies 62 and 64, the polarity of the code on the reference transparency is inverted with respect to the code on reference transparency 63. As a result, yellow light is transmitted through reference transparency 64 and reflected from mirrors 69 and 66 onto the photochromic strip at the rear focal point of imaging lens 67 at every moment except when auto correlation occurs between the object and reference transparencies. As a consequence, the average affect of the ultraviolet and yellow beams on the photochromic strip will be cancelled at all times except at the instant correlation occurs. Thus, if the photochromic strip is initially set in the clear or opaque state, it will remain in that state until the instant of correlation, at which time it will switch toward the opposite state.

Various object transparencies may be inserted in the path of the ultraviolet and yellow beams to perform a static correlation but if real time operation is required, information must be correlated instantaneously (or nearly so) as it is recorded on the object transparencies. This may be accomplished by translating the object transparencies past the reference transparencies in a direction orthogonal to the collimated light beams. Motion of the object transparencies can be provided by any means such as a conventional film transport or by mounting the transparency on a rotatable disc or drum. It may also be considered desirable to integrate the instantaneous correlation products on discrete spatial segments of the photochromic strip. This can be realized simply by translating the photochromic strip in synchronism with the object transparencies. Then, if the transparency patterns are approximately half transparent and half opaque to the ultraviolet and yellow light beams, all regions of the photochromic strip will remain in their original state except for the segment located at the focal point of lens 67 at the instant auto correlation occurs. Motion of the photochromic strip can be accomplished in the same manner as for the object transparencies.

In both the coherent and non-coherent correlation devices the D.C. background will not be completely suppressed if the code or other pattern on the transparencies is not comprised of approximately equal opaque and transparent areas. For instance, in the embodiment of FIG. 6, if 70% of the code or patterned area on reference transparency 63 is transmissive to ultraviolet light, then only 30% of the area on reference transparency 64 will be transmissive to yellow light since, as previously mentioned, the pattern on reference transparency 64 is the inverse or negative of the pattern on reference transparency 63. Consequently, the amount of yellow light impinging on the non-correlation segments of the photochromic strip will be less than the ultraviolet light and their opacity will be affected accordingly. This may be compensated by placing an attenuating filter 70 in the path of the ultraviolet beam so that the light beams will have equal but opposite effects upon the opacity of the photochromic strip.

While the invention has been described in its preferred embodiments, it is to be understood that the words which have been used are words of description rather than limitation and that changes may be made without departing from the true scope and spirit of the invention.

We claim:
1. An optical correlator apparatus comprising
   a bistable recording medium positioned in the correlation plane;
   first and second optical multipliers each having first and second multiplier elements comprising a modulated light beam directed onto a coded transparency, a multiplier element in the first optical multiplier carrying information of opposite polarity with respect to a multiplier element in the second optical multiplier, said optical multipliers being disposed such that the light beams therefrom are in spatial coincidence on the recording medium, and the light output from said first and second optical multipliers being of first and second discrete wavelengths respectively for oppositely affecting the relative opacity of the recording medium; and
   means for moving the coded transparencies in a plane oriented normal to the central axis of the light beams propagating in the optical multipliers, the rate of motion of the transparencies being proportional to the temporal intensity by modulation of the light beams.

2. The apparatus of claim 1 wherein the transparencies in the first and second optical multipliers are identical except that one carries information which is inverted with respect to the information on the other.

3. The apparatus of claim 1 wherein the intensity modulation applied to the light beam propagating in the first optical multiplier is the inverse of the intensity modulation applied to the light beam propagating in the second optical multiplier.

4. The apparatus of claim 1 and further including
   optical filter means positioned in each of the optical multipliers to intercept the light beam prior to incidence on the transparency, each of the filters being transmissive to light of a different discrete wavelength,
   means in each optical multiplier for converging the light beams propagating therein, and
   means for superimposing the converging beams so that spatially coincident images of the transparencies are formed on the recording medium.

5. The apparatus of claim 4 wherein the code on each transparency comprises a plurality of bits of which essentially half are transparent and the remainder opaque to light of the discrete wavelength propagating in each of the multipliers, the codes being identical except that the polarity of one is inverted with respect to the other.

6. An optical correlator apparatus comprising a bistable recording medium positioned in the correlation plane;

first and second optical multipliers each including first and second transparencies, the pattern on a transparency in the first optical multiplier being a negative replica of the pattern on a transparency in the second optical multiplier, said optical multipliers being disposed such that the light beams therefrom are in spatial coincidence on the recording medium, and the light output from said first and second optical multipliers being of first and second discrete wavelengths respectively for oppositely affecting the relative opacity of the recording medium;

means for providing the light beams propagating in the optical multipliers;

means for moving one of the transparencies in each optical multiplier, the rate of motion being the same for both transparencies; and means for similarly moving the recording medium at the same rate as the transparencies.

References Cited

UNITED STATES PATENTS

| | | | |
|---|---|---|---|
| 3,178,997 | 4/1965 | Kelly | 350—160 |
| 3,398,269 | 8/1968 | Williams | 235—181 |
| 3,401,268 | 9/1968 | Lea | 235—181 X |

OTHER REFERENCES

Trabka et al.: Image transformations for pattern recognition using incoherent illumination and bipolar aperture masks.

Journal of the Optical Society of America, vol. 54, No. 10, October 1964 (pp. 1242–1251).

MALCOLM A. MORRISON, Primary Examiner

F. D. GRUBER, Assistant Examiner

U.S. Cl. X.R.

235—194; 350—160; 356—71